(12) United States Patent
Tseng et al.

(10) Patent No.: US 8,693,181 B2
(45) Date of Patent: Apr. 8, 2014

(54) PORTABLE ELECTRONIC DEVICE

(75) Inventors: Huai-Te Tseng, Taipei (TW); Ching-Fu Yang, Taipei (TW)

(73) Assignee: Compal Electronics, Inc., Taipei (TW)

(*) Notice: Subject to any disclaimer, the term of this patent is extended or adjusted under 35 U.S.C. 154(b) by 271 days.

(21) Appl. No.: 13/188,427

(22) Filed: Jul. 21, 2011

(65) Prior Publication Data

US 2012/0162871 A1  Jun. 28, 2012

(30) Foreign Application Priority Data

Dec. 27, 2010 (TW) .............................. 99146136 A

(51) Int. Cl.
    G06F 1/16    (2006.01)
(52) U.S. Cl.
    USPC ............ 361/679.27; 361/679.26; 361/679.28; 361/679.59; 312/223.1; 312/223.2
(58) Field of Classification Search
    USPC ..................................... 361/679.27
    See application file for complete search history.

(56) References Cited

U.S. PATENT DOCUMENTS

| | | | | |
|---|---|---|---|---|
| 6,002,583 | A * | 12/1999 | Shoji et al. | 361/679.55 |
| 6,191,941 | B1 * | 2/2001 | Ito et al. | 361/679.27 |
| 6,337,795 | B1 * | 1/2002 | Wang | 361/695 |
| 6,385,039 | B1 * | 5/2002 | Chiang et al. | 361/679.09 |
| 6,452,795 | B1 * | 9/2002 | Lee | 361/679.41 |
| 6,456,488 | B1 * | 9/2002 | Foster et al. | 361/679.1 |
| 6,535,378 | B1 * | 3/2003 | Oguchi et al. | 361/679.55 |
| 6,612,668 | B2 * | 9/2003 | Doan | 312/223.2 |
| 6,768,637 | B1 * | 7/2004 | Amemiya | 361/679.55 |
| 6,930,881 | B2 * | 8/2005 | Karidis et al. | 361/679.55 |
| 6,961,240 | B2 * | 11/2005 | Janicek | 361/679.46 |
| 7,121,876 | B2 * | 10/2006 | Chien | 439/500 |
| 7,206,198 | B2 * | 4/2007 | Wang | 361/679.55 |
| 7,502,222 | B2 * | 3/2009 | Cheng et al. | 361/679.55 |
| 8,295,039 | B2 * | 10/2012 | Cheng et al. | 361/679.26 |
| 2002/0071250 | A1 * | 6/2002 | Shih | 361/695 |
| 2005/0059283 | A1 * | 3/2005 | Lo | 439/296 |

FOREIGN PATENT DOCUMENTS

| | | |
|---|---|---|
| TW | 200833218 | 8/2008 |
| TW | I301528 | 10/2008 |
| TW | M388813 | 9/2010 |

OTHER PUBLICATIONS

"Office Action of Taiwan Counterpart Application", issued on Dec. 18, 2012, p. 1-p. 7.

* cited by examiner

*Primary Examiner* — Anthony Q Edwards

(74) *Attorney, Agent, or Firm* — Jianq Chyun IP Office

(57) ABSTRACT

An electronic device includes a first body, a second body and a battery base. The second body is pivoted to the first body and has a first block. The battery base is pivoted to the first body and has a second block. When the second body rotates relative to the first body, the first block is driven to contact the second block and push the second block for driving the battery base to pivot relative to the first body.

13 Claims, 12 Drawing Sheets

PORTABLE ELECTRONIC DEVICE

CROSS-REFERENCE TO RELATED APPLICATION

This application claims the priority benefit of Taiwan application Ser. No. 99146136, filed on Dec. 27, 2010. The entirety of the above-mentioned patent application is hereby incorporated by reference herein and made a part of this specification.

BACKGROUND OF THE INVENTION

1. Field of the Invention

The invention relates to an electronic device, and particularly to an electronic device with a rotatable battery base.

2. Description of Related Art

Using computer notebooks as an example, general computer notebooks are assembled through a main body and a display apparatus, wherein the main body and the display apparatus pivot relative to each other. The user can use the relative pivoting between the main body and the display apparatus to close the display apparatus and the main body of the computer notebook for portable convenience, and unfold the display apparatus and main body when using the computer notebook. In order to allow the user to operate the computer notebook with ease, some computer notebooks will have a supporting structure on the bottom of the main body, used to prop up the main body of the computer notebook and tilt the computer on the table. However, users must first raise the computer notebook a distance away from the table, to then manually open the supporting structure, making the process very inconvenient.

SUMMARY OF THE INVENTION

The invention provides an electronic device, where a battery can rotate relative to a body when the body unfolds, so the body is propped up from the table.

The invention provides an electronic device including a first body, a second body and a battery base. The second body is pivoted to the first body and has a first block. The battery base is pivoted to the first body and has a second block. When the second block rotates relative to the first body, the first block is driven to contact the second block, and push the second block so that the battery base pivots relative to the first body.

In an embodiment of the invention, the electronic device further includes an elastic element. The battery base has a concave, and the elastic element is connected to the second block and the concave.

In an embodiment of the invention, an end of the second block is pivoted to the battery base, and another end of the second block is connected to the elastic element.

In an embodiment of the invention, the second body has a third block, and the battery base has a fourth block. When the second body closes on the first body, the third block is driven to contact the fourth block, and the third block pushes the fourth block so the battery base pivots relative to the first body.

In an embodiment of the invention, the electronic device further includes an elastic element. The battery base has a concave, and the elastic element is connected to the fourth block and the concave.

In an embodiment of the invention, an end of the fourth block is pivoted to the battery base, and another end of the fourth block is connected to the elastic element.

In an embodiment of the invention, the second body has two pivot structures, and the battery base is disposed between the two pivot structures.

In an embodiment of the invention, the electronic device further includes a battery, fixed in the battery base.

In an embodiment of the invention, the battery base has a rib, and the battery has a slot. The rib is lodged in the slot to fix the relative position between the battery base and the battery.

In an embodiment of the invention, the first body has a circuit board, and the battery base has a connector and a cable. The battery is connected to the connector, and the cable is connected between the circuit board and the connector.

The invention provides an electronic device including a first body, a second body and a battery base. The first body has a bottom surface flatly disposed on a flat surface. The second body is pivoted to a side of the first body. The battery base is pivoted to the side of the first body. When the second body rotates relative to the first body, the battery base is driven to pivot relative to the first body and prop up the bottom surface of the first body from the flat surface.

In an embodiment of the invention, when the bottom surface of the first body is propped up from the flat surface, the bottom surface of the first body, the battery base, and the flat surface form a heat dissipation channel.

In an embodiment of the invention, at least a heat dissipation hole is disposed on the bottom surface or the side of the first body.

Based on the above, the battery base of the invention is pivoted to the first body. The second body and the battery base respectively have a first block and a second block. When the second body opens relative to the first body, the first block pushes the second block of the battery base, and drives the battery base to rotate so the battery disposed in the battery base props up the first body. Compared to conventional technology, the invention does not require additional support structures to prop up the first body. In addition, when the user is opening the second body, the first body simultaneously tilts, allowing the operation of the electronic device to be more comfortable.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
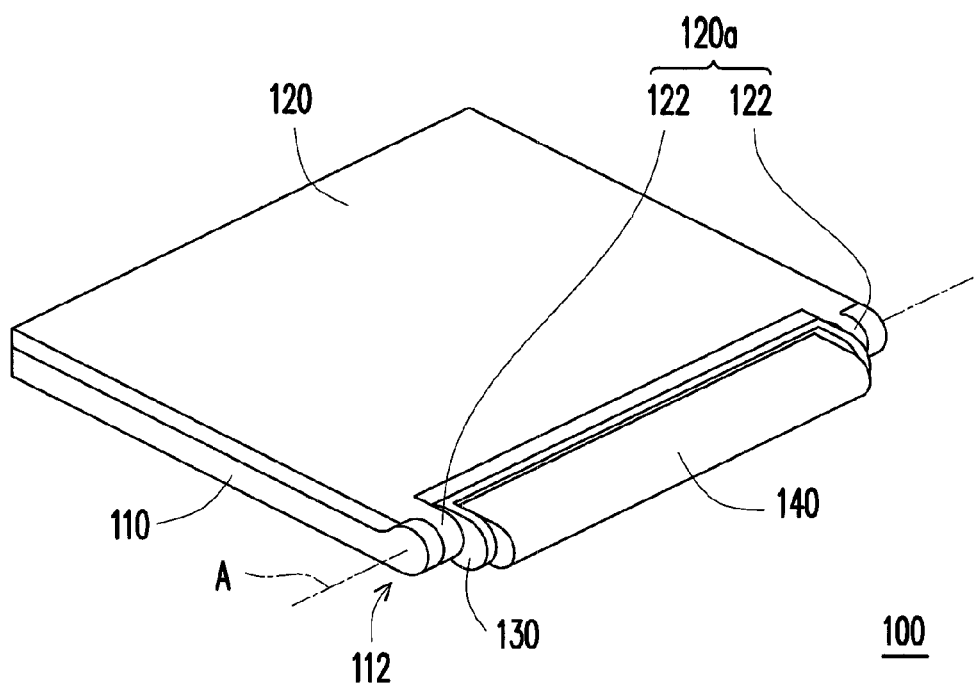
FIG. 1 is a three dimensional schematic view of an electronic device according to an embodiment of the invention.
Figure 2:
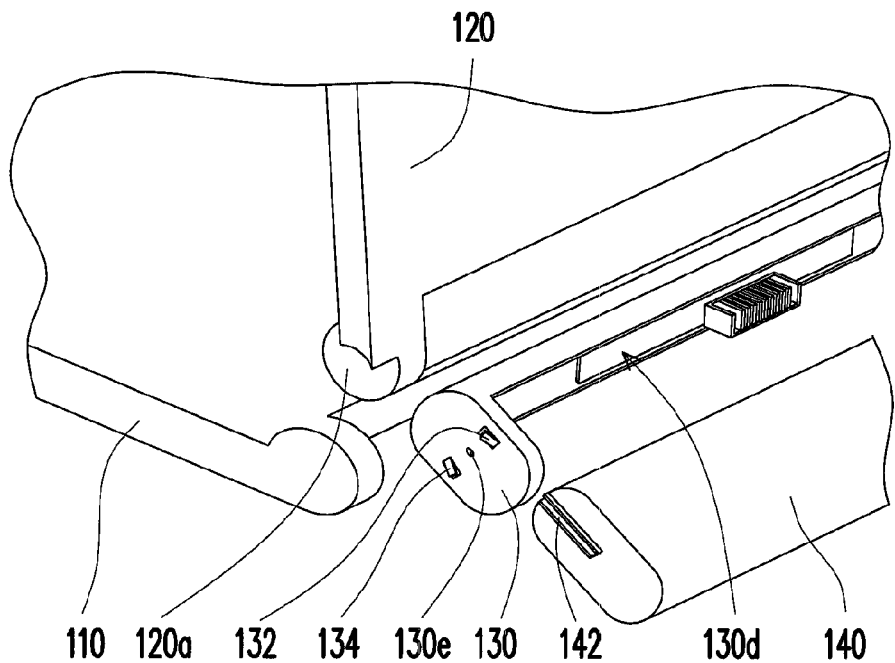
FIG. 2 and FIG. 3 are partial exploded schematic views of the electronic device of FIG. 1 at different perspectives, respectively.
Figure 3:
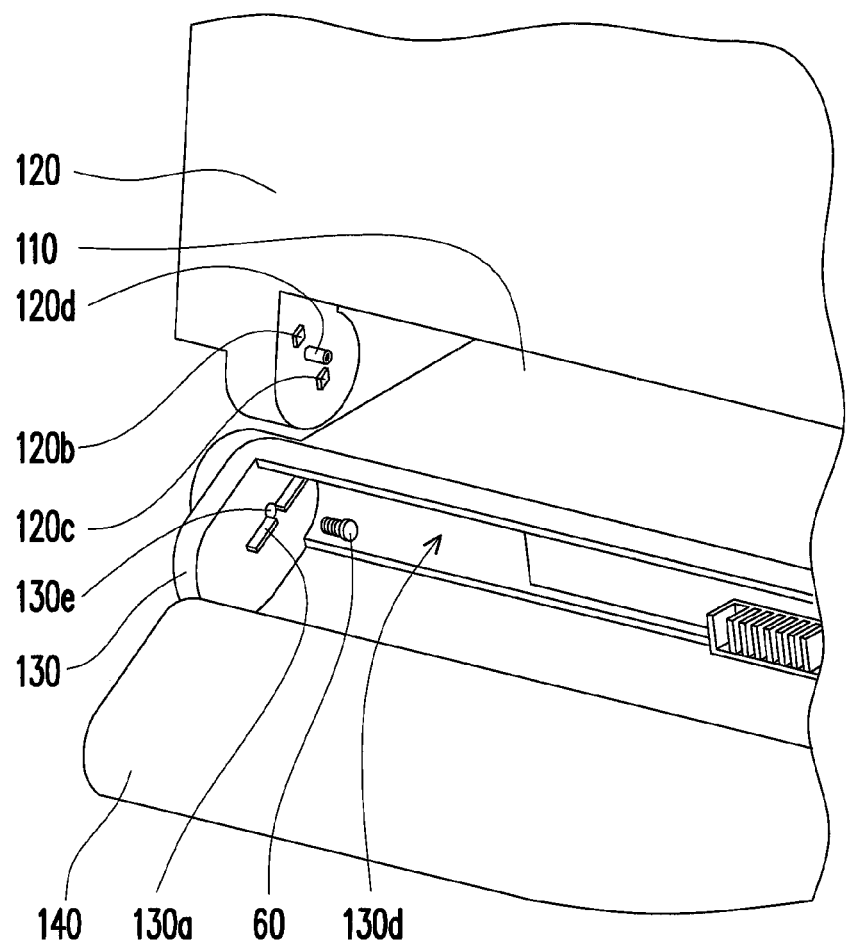

FIG. 1 is a three dimensional schematic view of an electronic device according to an embodiment of the invention. FIG. 2 and FIG. 3 are partial exploded schematic views of the electronic device of FIG. 1 at different perspectives, respectively. Referring to FIG. 1 to FIG. 3, the electronic device 100 of the embodiment is, for example, a computer notebook. The electronic device 100 includes a first body 110, a second body 120, a battery base 130, and a battery 140. The first body 110 and the second body 120, for example, are the main body and the display apparatus of the computer notebook, respectively. The second body 120 has a pivot portion 120a, wherein the pivot portion 120a is pivoted to the first body 110 along an axis A, and has a first block 120b. The battery base 130 is pivoted to the first body 110 along the axis A and has a second block 132. The battery 140 is disposed in the battery base 130.

Figure 4A:
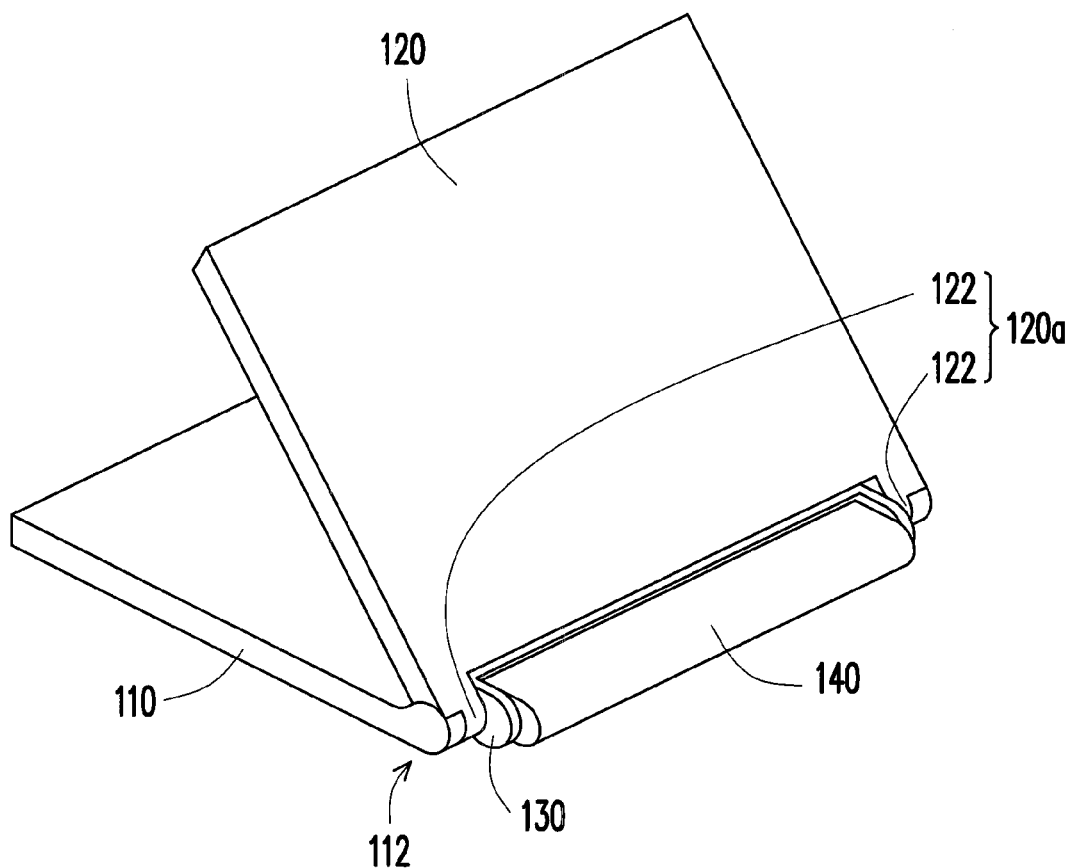
FIGS. 4A to 4C schematically show the operation process of the electronic device of FIG. 1.
Figure 4B:
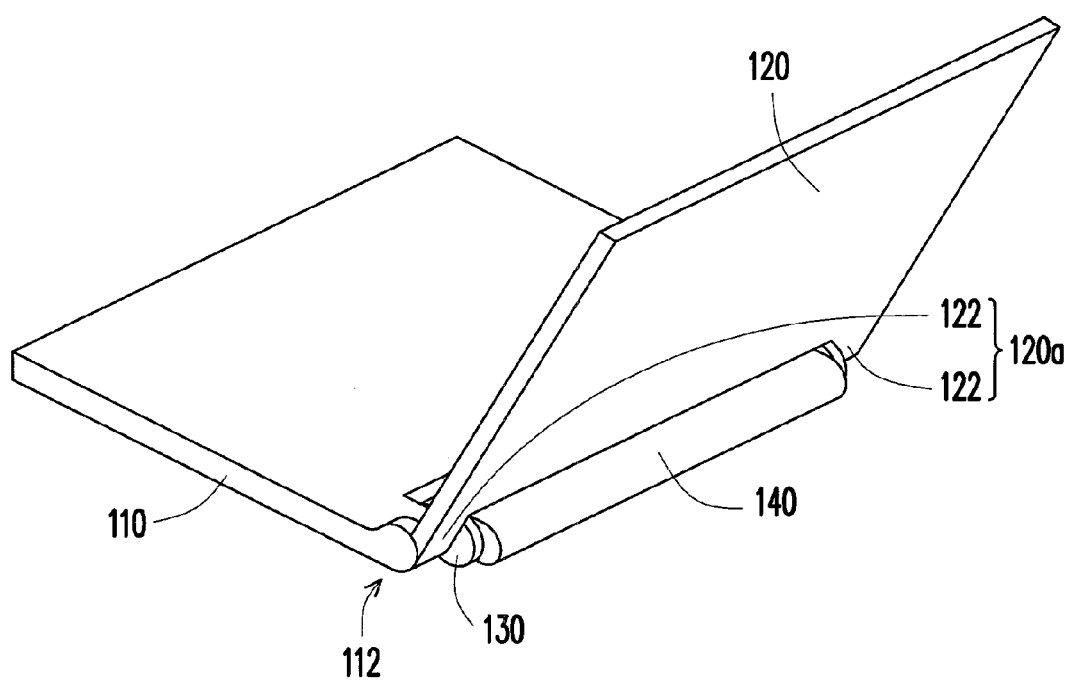
Figure 4C:
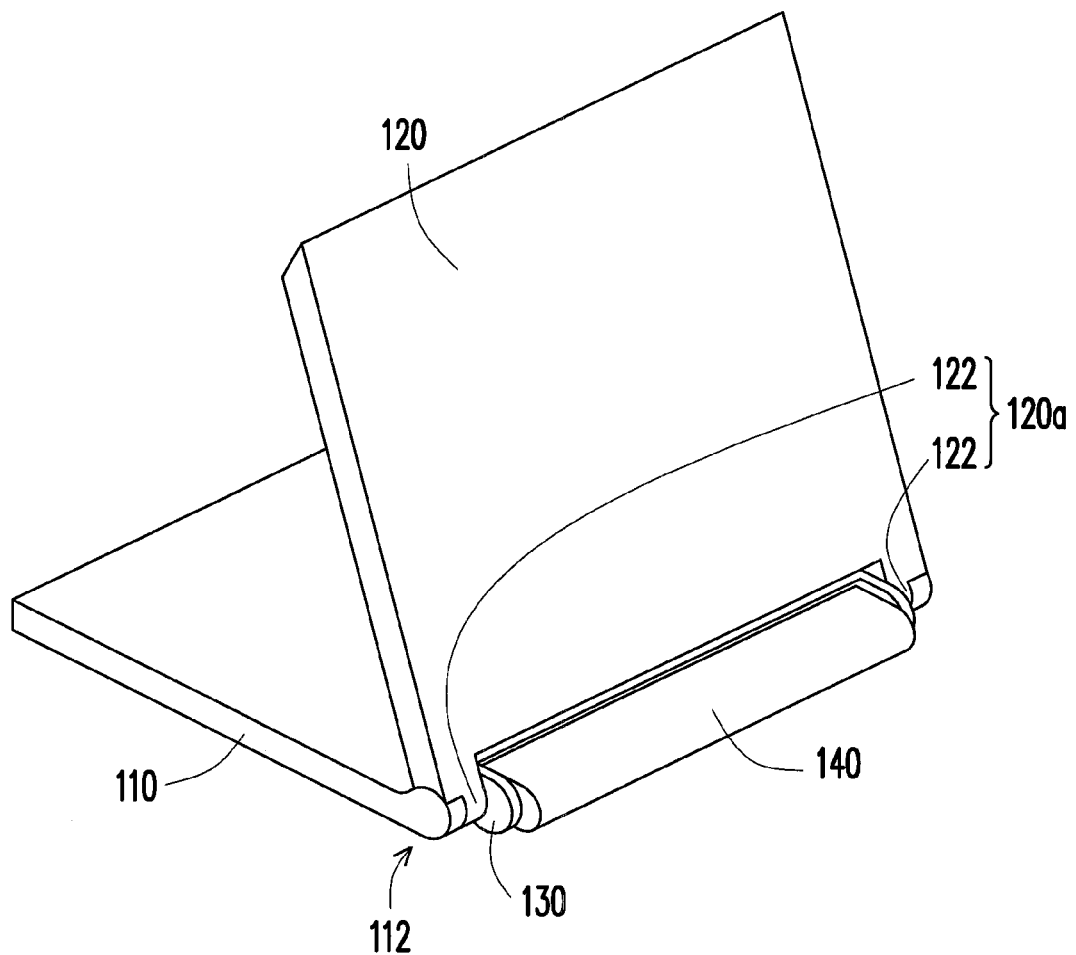
Figure 5A:
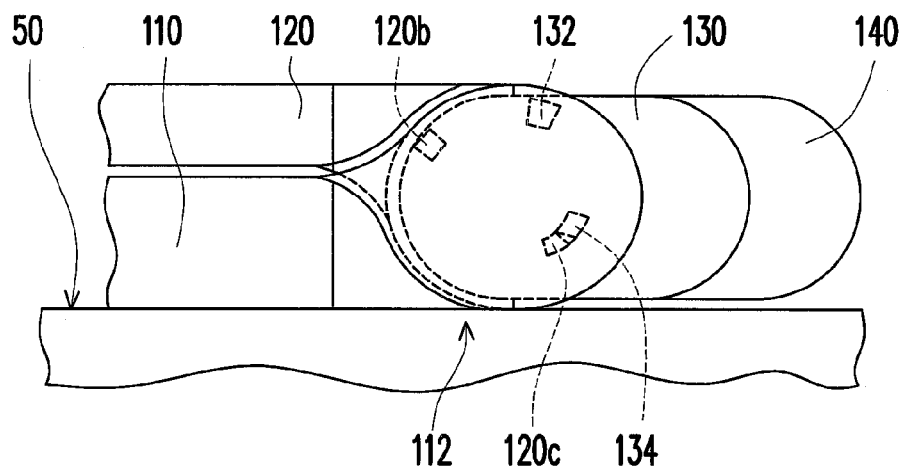
FIGS. 5A to 5D are partial schematic side views of FIG. 1 and FIGS. 4A to 4C, respectively.
Figure 5B:
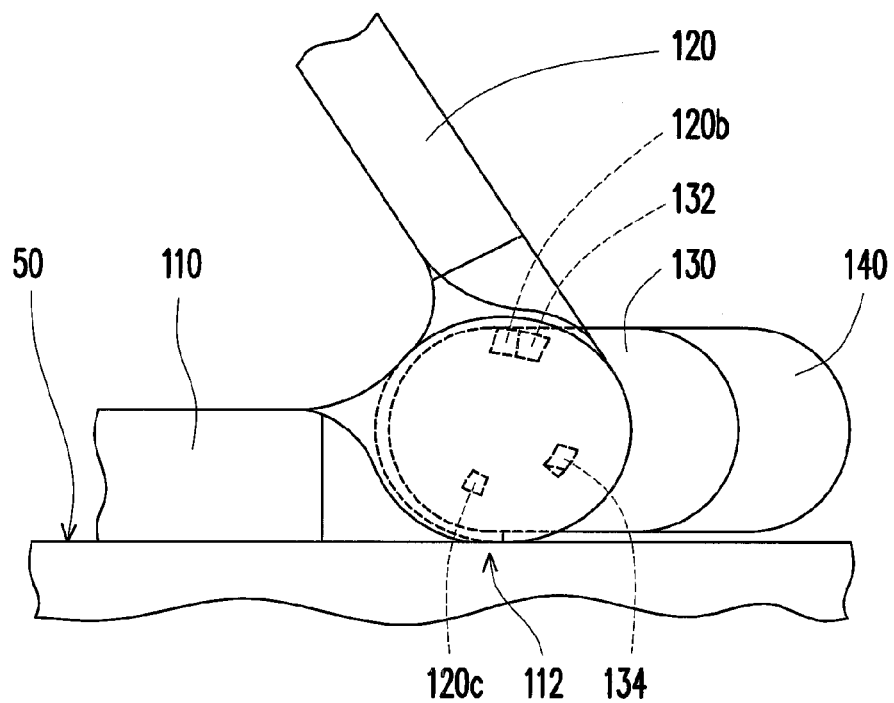

FIGS. 4A to 4C schematically show the operation process of the electronic device of FIG. 1. FIGS. 5A to 5D are partial schematic side views of FIG. 1 and FIGS. 4A to 4C, respectively. Referring to FIG. 5A, the first body 110 is suitable to be placed on a flat surface 50, wherein the flat surface is, for example, a table or another suitable flat surface for placing an electronic device 100. When the second body 120 closed on the first body 110 (shown in FIG. 1 and FIG. 5A) is opened relative to the first body 110 to the position shown in FIG. 4A and FIG. 5B, the first block 120b will be driven to contact the second block 132. When the second body 120 from the position in FIG. 4A and FIG. 5B, is further opened relative to the first body 110 to the position shown in FIG. 4B and FIG. 5C, the first block 120b pushes the second block 132 so the battery base 130 pivots relative to the first body 110, to drive the battery 140 to prop up a side 112 of the first body 110 away from the flat surface 50.

Thus, when the user is opening the second body 120, the first body 110 simultaneously tilts from the flat surface 50 (shown in FIG. 5C), allowing the operation of the electronic device 100 to be more comfortable. In addition, no additional support structures are required to prop up the first body 110.

Referring to FIG. 2 and FIG. 3, the battery base 130 of the embodiment has a pivot hole 130e. The pivot portion 120a of the second body 120 has a pivot shaft 120d. The pivot hole 130e and the pivot shaft 120d can pivot mutually through a pivot element 60, so the battery base 130 is pivoted to the first body 110 and the second body 120. In other embodiments, other suitable methods may be used to pivot the battery base 130. The invention is not limited thereto.

In addition, referring to FIG. 2 and FIG. 3, in the embodiment, the pivot portion 120a further has a third block 120c, and the battery base 130 further has a fourth block 134. When the second body 120 closes relative to the first body 110 from the position shown in FIG. 4B and FIG. 5C to the position shown in FIG. 4C and FIG. 5D, the third block 120c will be driven to contact the fourth block 134. When the second body 120 further closes relative to the first body 110 from the position shown in FIG. 4C and FIG. 5D, to the position shown in FIG. 1 and FIG. 5A, and closes on the first body, the third block 120c pushes the fourth block 134 so the battery base 130 pivots relative to the first body 110, driving the battery 140 to restore its position so the side 112 of the first body 110 lowers until the flat surface 50. In addition, the user only needs to open or close the second body 120 relative to the first body 110, to drive the battery 140 to prop up the first body 110 or restore the position of the battery 140, improving the convenience for the user.

Referring to FIG. 1, in detail, the pivot portion 120a of the embodiment includes two pivot structures 122. The two pivot structures 122 extend from the second body 120 and are located on the axis A. The battery base 130 is then disposed between the two pivot structures 122. Referring to FIG. 2 and FIG. 3, the battery base 130 has a receptacle 130d, and the battery 140 is fixed in the receptacle 130d. In addition, the battery base 130 has a rib 130a, and the battery 140 has a slot 142. The rib 130a is lodged in the slot 142 to fix the relative position between the battery base 130 and the battery 140.

Figure 6:
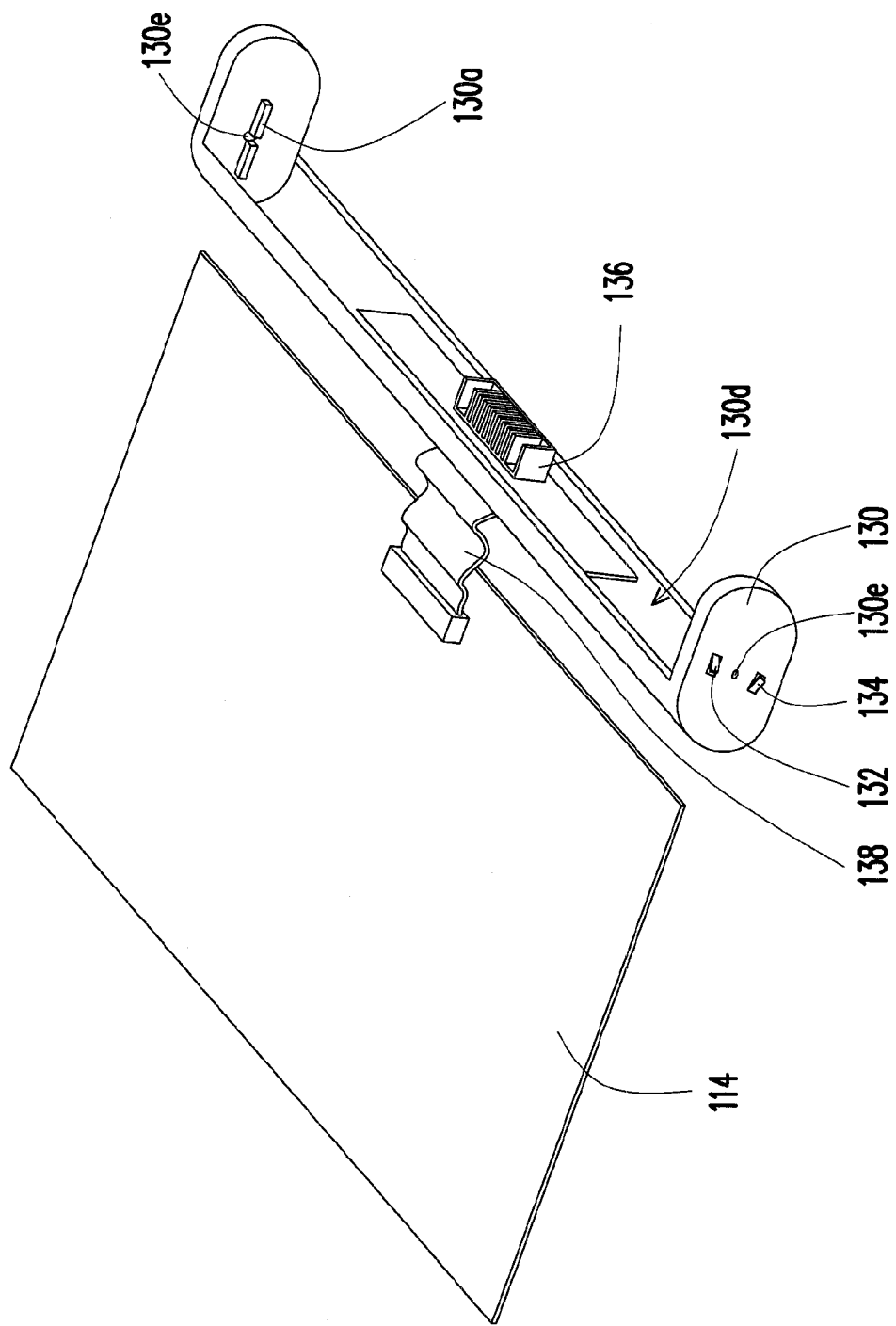
FIG. 6 is a three dimensional schematic view of parts of the electronic device in FIG. 1.
Figure 7:
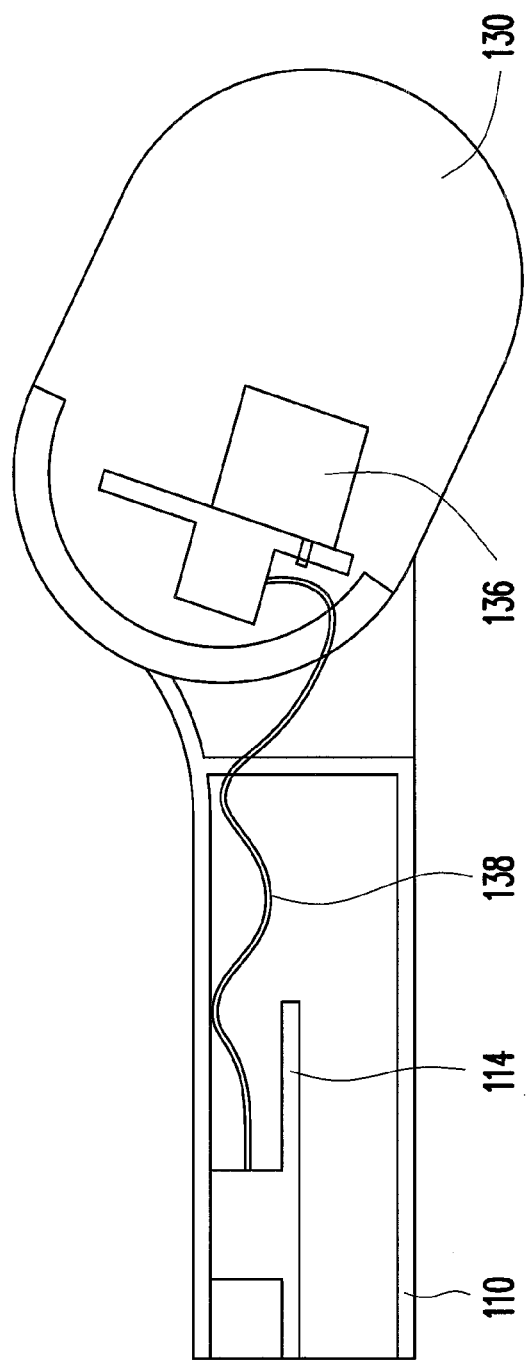
FIG. 7 is a partial cross-section schematic view of the electronic device of FIG. 4B.

FIG. 6 is a three dimensional schematic view of parts of the electronic device in FIG. 1. Referring to FIG. 1 and FIG. 6, in the embodiment, the first body 110 has a circuit board 114, and the battery base 130 has a connector 136 and a cable 138. The cable 138 is connected between the circuit board 114 and the connector 136. When the battery 140 is disposed in the battery base 130 as shown in FIG. 1, the battery 140 will connect to the connector 136, and will be electrically connected to the circuit board 114 through the connector 136 and the cable 138. FIG. 7 is a partial cross-section schematic view of the electronic device of FIG. 4B. Referring to FIG. 7, since the cable 138 is flexible, when the battery base 130 rotates relative to the first body 110, the cable 138 can be bent, so as to maintain the connection between the circuit board 114 and the connector 136.

Figure 8:
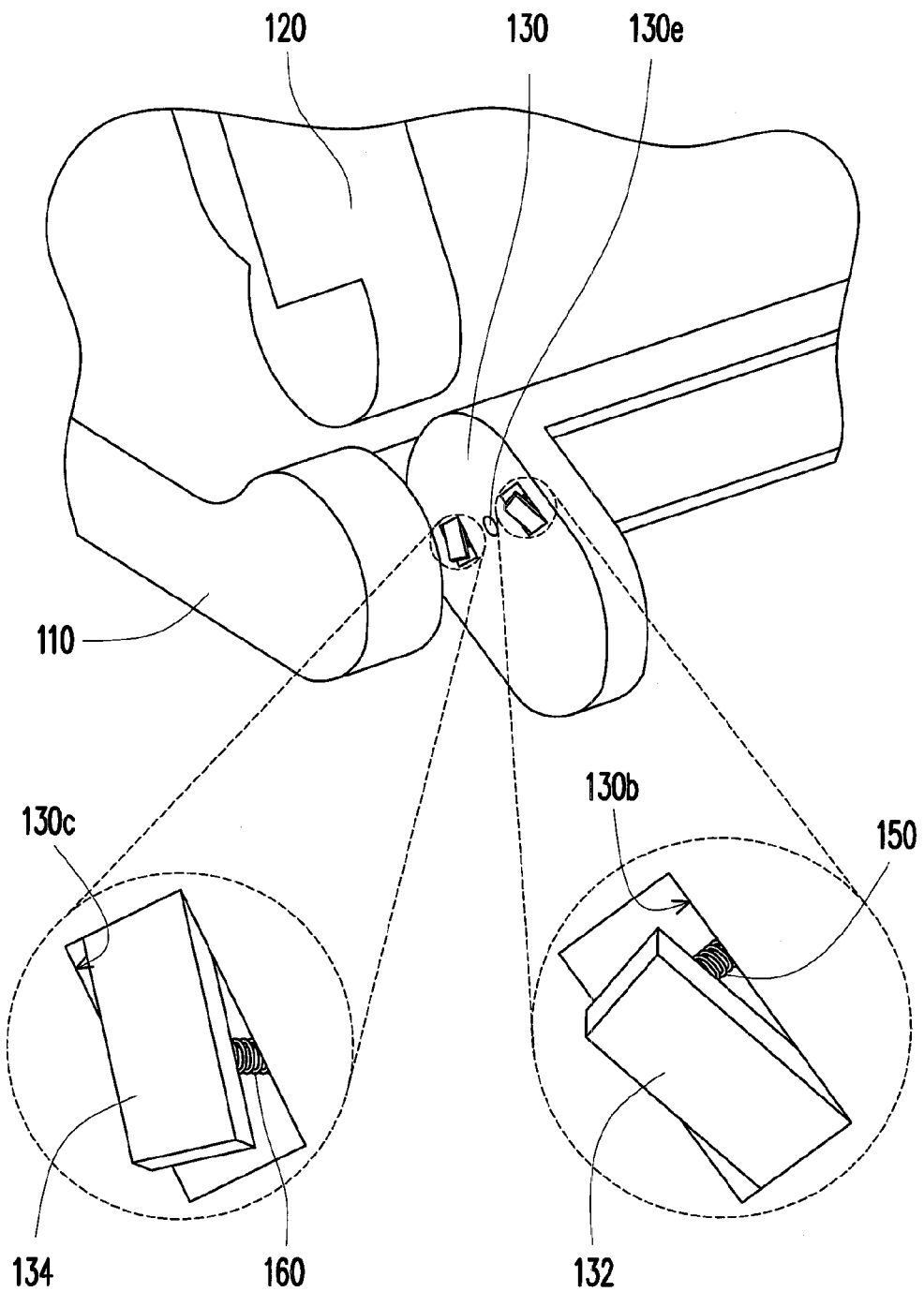
FIG. 8 is a three dimensional partial schematic view of the electronic device of FIG. 1.
Figure 9:
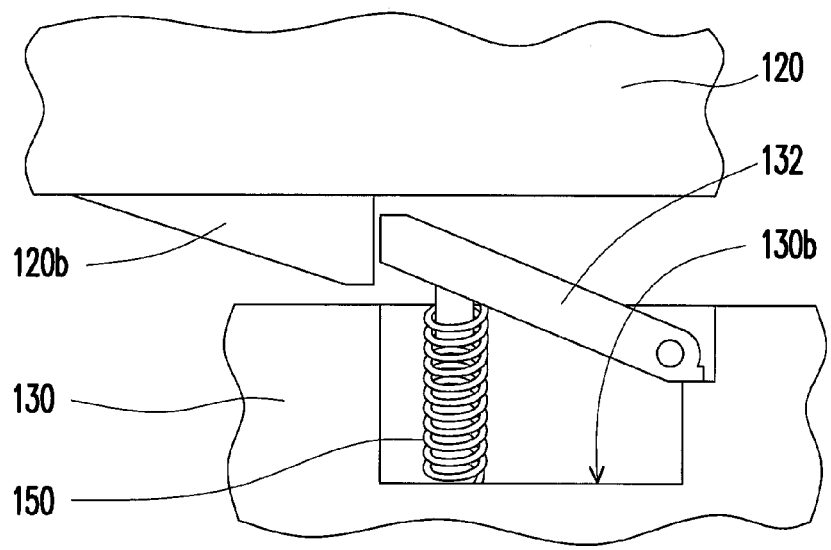
FIG. 9 is a schematic view of the first block and the second block of FIG. 5B.

FIG. 8 is a three dimensional partial schematic view of the electronic device of FIG. 1. FIG. 9 is a schematic view of the first block and the second block of FIG. 5B. Referring to FIG. 8 and FIG. 9, the electronic device 100 (referenced in FIG. 1) of the embodiment further includes an elastic element 150, and the battery base 130 has a concave 130b. The elastic element 150 is, for example, a compression spring, and is connected between the second block 132 and a bottom surface of the concave 130b. The second block 132 resists the elasticity of the elastic element 150 to enter in the concave 130b. In detail, an end of the second block 132 is pivoted to the battery base 130, and another end of the second block 132 is connected to the elastic element 150. Thus, during the process of assembling the battery base 130 to the first body 110 and the second body 120, the second block 132 can temporarily enter in the concave 130b, to avoid the second block 132 being an obstacle and blocking the assembly process.

Figure 10:
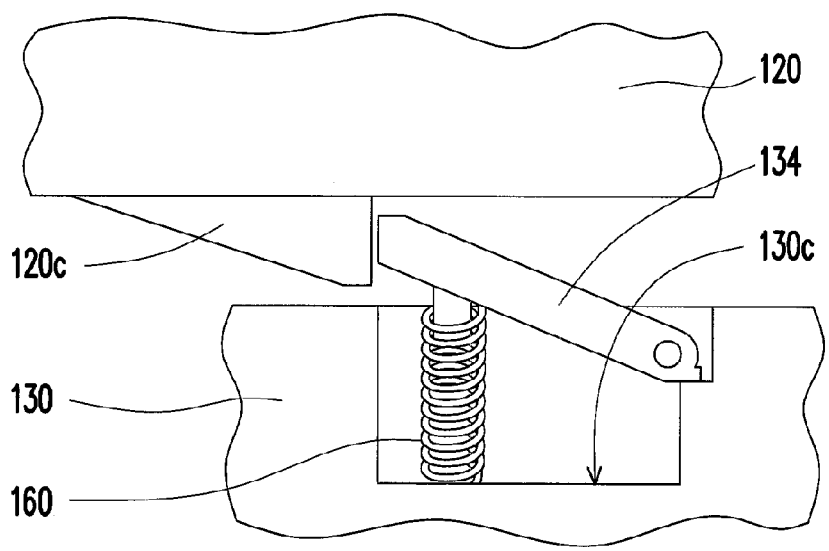
FIG. 10 is a schematic view of the third block and the fourth block of FIG. 5A.

FIG. 10 is a schematic view of the third block and the fourth block of FIG. 5A. Referring to FIG. 9 and FIG. 10, the electronic device 100 (referenced in FIG. 1) of the embodiment further includes an elastic element 160, and the battery base 130 has a concave 130c. The elastic element 160 is, for example, a compression spring, and is connected between the fourth block 134 and a bottom surface of the concave 130c. The fourth block 134 resists the elasticity of the elastic element 160 to enter in the concave 130c. In detail, an end of the fourth block 134 is pivoted to the battery base 130, and another end of the fourth block 134 is connected to the elastic element 160. Thus, during the process of assembling the battery base 130 to the first body 110 and the second body 120, the fourth block 134 can temporarily enter in the concave 130c, to avoid the fourth block 134 being an obstacle and blocking the assembly process.

Figure 5C:
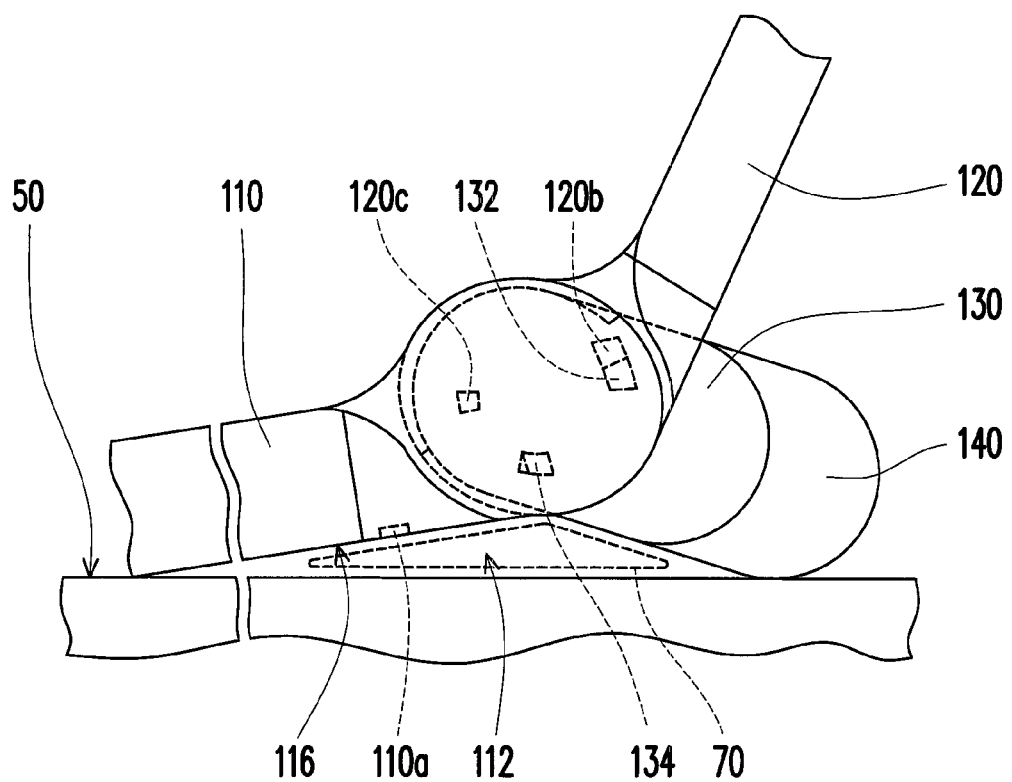
Figure 5D:
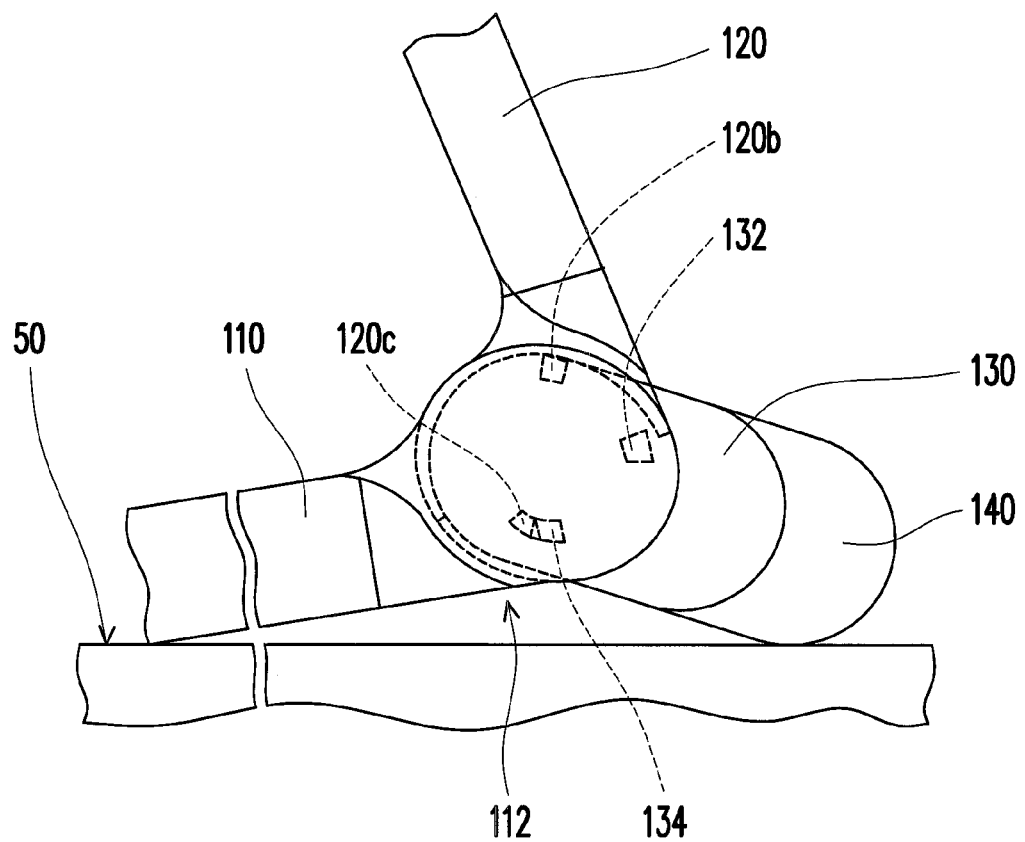

Referring to FIG. 5C, the first body 110 of the embodiment has a bottom surface 116, and at least one heat dissipation hole 110a is disposed on the bottom surface 116 or the side 112 of the first body 110 (the heat dissipation hole 110a is shown to be disposed on the bottom surface 116). When the second body 120 rotates relative to the first body 110 to the state shown in FIG. 5C, the battery base 130 is driven to pivot relative to the first body 110 and prop up the bottom surface 116 of the first body 110 from the flat surface 50. At this point, the bottom surface 116 of the first body 110, the battery base 130, and the flat surface 50 form a heat dissipation channel 70, so the first body 110 can undergo heat dissipation through the heat dissipation hole 110a and the heat dissipation channel 70.

Generally, the battery base of the invention is pivoted to the first body. The second body and the battery base respectively have a first block and a second block. When the second body opens relative to the first body, the first block of the second body pushes the second block of the battery base, and drives the battery base to rotate so the battery disposed in the battery base props up the first body. Thus, when the user is opening the second body, the first body simultaneously tilts, allowing the operation of the electronic device to be more comfortable. In addition, no additional support structures are required to prop up the first body. Furthermore, the second body and the battery base respectively have a third block and a fourth block. When the second body closes relative to the first body, the third block of the second body pushes the fourth block of the battery base, and drives the battery to restore to its original position. Thus, the user only needs to open or close the second body relative to the first body, to drive the battery to prop up the first body or restore the position of the battery, improving the convenience for the user.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
    a first body;
    a second body, pivoted to the first body and has a first block; and
    a battery base, pivoted to the first body and has a second block, wherein when the second body rotates relative to the first body, the first block is driven to contact the second block and push the second block for driving the battery base to pivot relative to the first body.

2. The electronic device as claimed in claim 1, further comprising:
    an elastic element, the battery base having a concave, the elastic element is connected to the second block and the concave, and the second block is adapted to resist the elasticity of the elastic element to enter in the concave.

3. The electronic device as claimed in claim 2, wherein an end of the second block is pivoted to the battery base, and another end of the second block is connected to the elastic element.

4. The electronic device as claimed in claim 1, wherein the second body has a third block, the battery base has a fourth block, when the second body closes onto the first body, the third block is driven to contact the fourth block, and the third block pushes the fourth block for driving the battery base to pivot relative to the first body.

5. The electronic device as claimed in claim 4, further comprising:
    an elastic element, the battery base having a concave, the elastic element is connected to the fourth block and the concave.

6. The electronic device as claimed in claim 5, wherein an end of the fourth block is pivoted to the battery base, and another end of the fourth block is connected to the elastic element.

7. The electronic device as claimed in claim 1, wherein the second body has two pivot structures, the battery base being disposed between the two pivot structures.

8. The electronic device as claimed in claim 1, further comprising a battery, fixed in the battery base.

9. The electronic device as claimed in claim 8, wherein the battery base has a rib, the battery has a slot, the rib being lodged in the slot to fix the relative position between the battery base and the battery.

10. The electronic device as claimed in claim 1, wherein the first body has a circuit board, the battery base has a connector and a cable, the battery being connected to the connector, the cable being connected between the circuit board and the connector.

11. An electronic device, comprising:
    a first body, having a bottom surface, and flatly disposed on a flat surface;
    a second body, pivoted to a side of the first body; and
    a battery base, pivoted to the side of the first body, wherein when the second body rotates relative to the first body, the battery base pushed by the second body is driven to pivot relative to the first body and prop up the bottom surface of the first body from the flat surface.

12. The electronic device as claimed in claim 11, wherein when the bottom surface of the first body is propped up from the flat surface, the bottom surface of the first body, the battery base, and the flat surface form a heat dissipation channel.

13. The electronic device as claimed in claim 11, wherein at least a heat dissipation hole is disposed on the bottom surface or the side of the first body.

* * * * *